United States Patent
Zhu et al.

(10) Patent No.: US 12,032,238 B2
(45) Date of Patent: Jul. 9, 2024

(54) OPTICAL ADJUSTING FILM, BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Heling Zhu, Beijing (CN); Xin Li, Beijing (CN); Jian Sang, Beijing (CN); Shubai Zhang, Beijing (CN); Kangle Chang, Beijing (CN); Lu Yu, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 769 days.

(21) Appl. No.: 17/265,691

(22) PCT Filed: Jul. 22, 2020

(86) PCT No.: PCT/CN2020/103434
§ 371 (c)(1),
(2) Date: Feb. 3, 2021

(87) PCT Pub. No.: WO2021/023009
PCT Pub. Date: Feb. 11, 2021

(65) Prior Publication Data
US 2021/0191192 A1 Jun. 24, 2021

(30) Foreign Application Priority Data
Aug. 2, 2019 (CN) .......................... 201910712077.4

(51) Int. Cl.
*G02F 1/1335* (2006.01)
*G02F 1/13* (2006.01)

(52) U.S. Cl.
CPC ...... *G02F 1/133524* (2013.01); *G02F 1/1323* (2013.01); *G02F 1/133607* (2021.01)

(58) Field of Classification Search
None
See application file for complete search history.

(56) References Cited

U.S. PATENT DOCUMENTS

2020/0271967 A1* 8/2020 Xiang ............... G02F 1/134309
2022/0216379 A1* 7/2022 Nakajima ............ H01L 33/502

FOREIGN PATENT DOCUMENTS

| CN | 102073079 A | 5/2011 |
|---|---|---|
| CN | 206057732 U | 3/2017 |

(Continued)

OTHER PUBLICATIONS

First Office Action issued on Dec. 22, 2023, for application No. CN201910712077.4 with English translation attached.

*Primary Examiner* — Phu Vu
(74) *Attorney, Agent, or Firm* — Nath, Goldberg & Meyer; Joshua B. Goldberg

(57) ABSTRACT

The present disclosure provides an optical adjusting film, a backlight module and a display device. The optical adjusting film according to the present disclosure includes a first substrate and a second substrate opposite to each other; a first electrode layer on a side of the first substrate facing the second substrate; a second electrode layer on a side of the second substrate facing the first substrate; a polymer dispersed liquid crystal layer between the first electrode layer and the second electrode layer; and an anti-adsorption surface layer on a side of the first substrate away from the second substrate, and/or a side of the second substrate away (Continued)

from the first substrate, and configured to suppress adsorption between the optical adjusting film and a solid surface.

17 Claims, 2 Drawing Sheets

(56) References Cited

FOREIGN PATENT DOCUMENTS

| | | | |
|---|---|---|---|
| CN | 106802499 A | 6/2017 | |
| CN | 107315209 A | 11/2017 | |
| CN | 109375302 A | 2/2019 | |
| CN | 109739040 A | 5/2019 | |
| CN | 209118011 U | 7/2019 | |
| CN | 110297341 A | 10/2019 | |
| CN | 210090869 U | 2/2020 | |
| CN | 111226164 A | 6/2020 | |
| CN | 106632883 B | 12/2020 | |
| CN | 113825641 A | 12/2021 | |
| JP | 2008076476 A | 4/2008 | |
| JP | 2019101142 A | 6/2019 | |
| KR | 20100043900 A | 4/2010 | |
| KR | 20140086143 A | 7/2014 | |
| WO | WO-2019025702 A1 * | 2/2019 | ............. B60J 1/001 |

* cited by examiner

OPTICAL ADJUSTING FILM, BACKLIGHT MODULE AND DISPLAY DEVICE

CROSS REFERENCE TO RELATED APPLICATION

This is a National Phase Application filed under 35 U.S.C. 371 as a national stage of PCT/CN2020/103434, filed on Jul. 22, 2020, an application claiming priority to Chinese patent application No. 201910712077.4, filed on Aug. 2, 2019, the disclosure of which is incorporated herein by reference.

TECHNICAL FIELD

The present disclosure belongs to the field of display technology, and particularly relates to an optical adjusting film, a backlight module and a display device.

BACKGROUND

An anti-peek film may be arranged between a liquid crystal display panel and a backlight module, and may control the light emitted by the backlight module to have a designated directivity, so that other people can be prevented from peeking into the current display content from a relatively inclined visual angle.

SUMMARY

According to a first aspect of the present disclosure, there is provided an optical adjusting film including:
- a first substrate and a second substrate opposite to each other;
- a first electrode layer on a side of the first substrate facing the second substrate;
- a second electrode layer on a side of the second substrate facing the first substrate;
- a polymer dispersed liquid crystal layer between the first electrode layer and the second electrode layer; and
- an anti-adsorption surface layer on a side of the first substrate away from the second substrate, and/or on a side of the second substrate away from the first substrate, the anti-adsorption surface layer being configured to suppress adsorption between the optical adjusting film and a solid surface.

In an embodiment, the anti-adsorption surface layer includes a substrate layer and a plurality of anti-adsorption particles, and the plurality of anti-adsorption particles are beyond a surface of the substrate layer away from the polymer dispersed liquid crystal layer.

In an embodiment, a diameter of the anti-adsorption particle is greater than a thickness of the substrate layer.

In an embodiment, a material of the substrate layer includes an ultraviolet curable resin or a thermosetting resin.

In an embodiment, the substrate layer further includes at least one of a photopolymerization initiator, a curing agent, a cross-linking agent, and a photosensitizer.

In an embodiment, a material of the anti-adsorption particle includes any one of silicone, polystyrene, polycarbonate, and calcium carbonate.

In an embodiment, a height h of the anti-adsorption particle beyond the surface of the substrate layer satisfies: $h \geq 1\ \mu m$.

In an embodiment, a diameter D of the anti-adsorption particle satisfies: $2\ \mu m \leq D \leq 4\ \mu m$.

In an embodiment, static friction coefficient k between the anti-adsorption surface layer and a lower polarizer satisfies: $k \leq 0.35$.

In an embodiment, static friction coefficient k between the anti-adsorption surface layer and an anti-peek film satisfies: $k \leq 0.35$.

In an embodiment, a contact angle a of distilled water with respect to a surface of the anti-adsorption surface layer away from the polymer dispersed liquid crystal layer satisfies: $a \geq 70°$.

In an embodiment, the first substrate includes a base material layer, an anti-scratch layer, and an undercoat layer stacked in this order in a direction from the first substrate to the polymer dispersed liquid crystal layer.

In an embodiment, the second substrate includes a base material layer, an anti-scratch layer, and an undercoat layer stacked in this order in a direction from the second substrate to the polymer dispersed liquid crystal layer.

In an embodiment, materials of the base material layer and the anti-scratch layer include polyethylene terephthalate.

In an embodiment, a material of the undercoat layer includes polyester resin or silicone resin.

According to a second aspect of the present disclosure, there is provided a backlight module including an optical adjusting film and an anti-peek film stacked with each other, and the optical adjusting film is the optical adjusting film provided according to the first aspect of the present disclosure, the optical adjusting film includes the anti-adsorption surface layer on the side of the second substrate away from the first substrate, and the anti-peek film is on a side of the anti-adsorption surface layer away from the second substrate.

In an embodiment, the backlight module further includes an optical film on a side of the anti-peek film away from the anti-adsorption surface layer.

In an embodiment, the optical film is a prism sheet, a diffusion sheet, or a light guide plate.

According to a third aspect of the present disclosure, there is provided a display device including a display panel and an optical adjusting film stacked with each other, and the optical adjusting film is the optical adjusting film provided according to the first aspect of the present disclosure.

In an embodiment, the display device further includes a lower polarizer, an anti-peek film and an optical film, the display panel, the lower polarizer, the optical adjusting film, the anti-peek film and the optical film are sequentially stacked, and the optical adjusting film includes the anti-adsorption surface layer on the side of the first substrate away from the second substrate, and on the side of the second substrate away from the first substrate.

DETAILED DESCRIPTION

To make those skilled in the art better understand the technical solutions of the present disclosure, the present disclosure will be further described in detail with reference to the accompanying drawings and the specific embodiments.

In order to enable the liquid crystal display device to switch between an anti-peek display mode and a non-anti-peek display mode, an optical adjusting film is provided between the liquid crystal display panel and the anti-peek film in the related art. The optical adjusting film has the function of changing the divergence degree of light, so that light with strong directivity emitted from the anti-peek film has controllable divergence characteristics after passing through the optical adjusting film.

There is a problem of adsorption between the optical adjusting film and the anti-peek film and a problem of adsorption between the optical adjusting film and display panel or the lower polarizer on the display panel, which may cause a poor display of water stain type.

Figure 1:
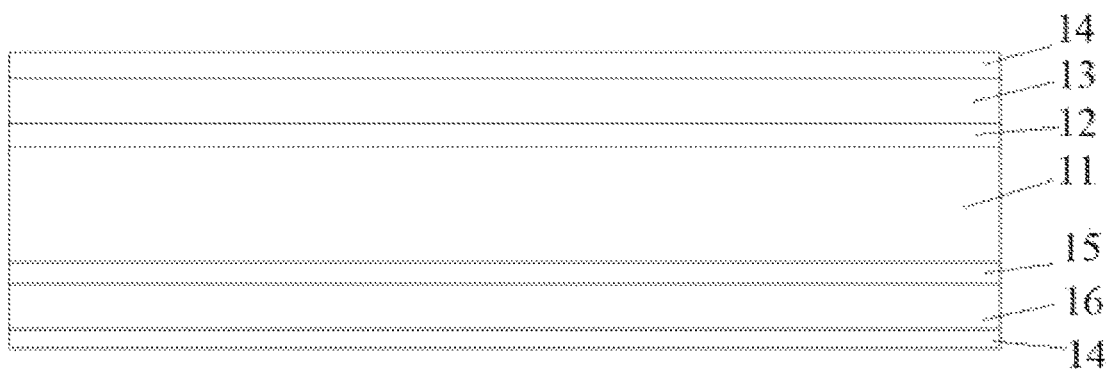
FIG. 1 is a schematic structural diagram of an optical adjusting film according to an embodiment of the present disclosure.
Figure 2:
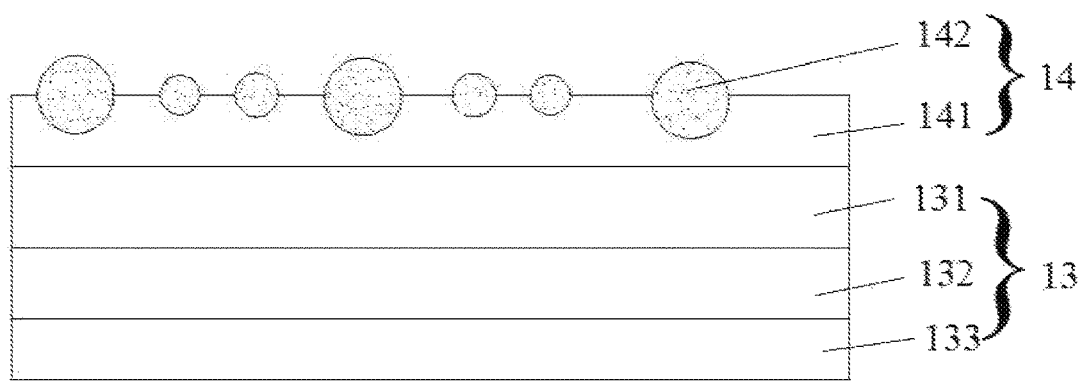
FIG. 2 is a schematic diagram of a detailed structure of part of an optical adjusting film according to an embodiment of the present disclosure.
Figure 3:
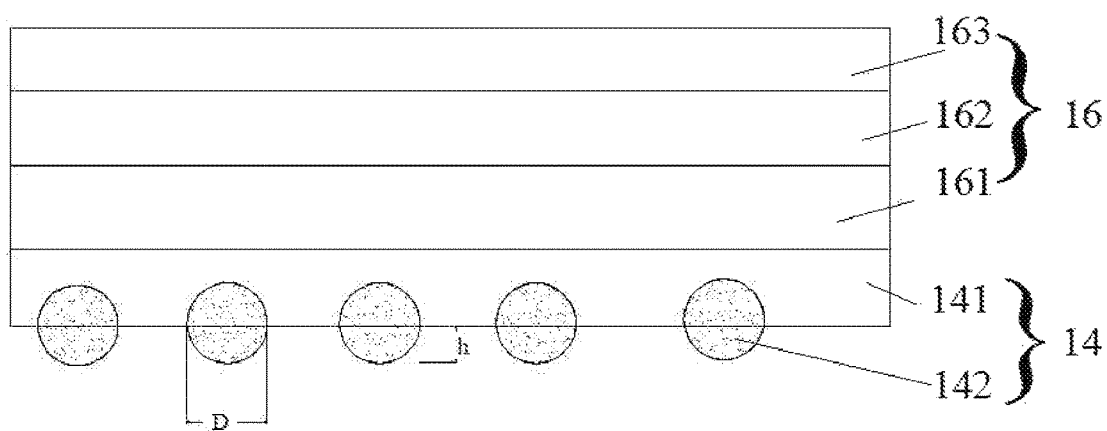
FIG. 3 is a schematic diagram of a detailed structure of part of an optical adjusting film according to an embodiment of the present disclosure.

Referring to FIGS. 1 to 3, the present embodiment provides an optical adjusting film including a first substrate 13 and a second substrate 16 opposite to each other, a first electrode layer 12 on a side of the first substrate 13 facing the second substrate 16, a second electrode layer 15 on a side of the second substrate 16 facing the first substrate 13, and a polymer dispersed liquid crystal layer 11 between the first electrode layer 12 and the second electrode layer 15.

In an embodiment, the polymer dispersed liquid crystal layer 11 may be formed by mixing a liquid crystal and a high-molecular polymer.

In practical applications, the polymer dispersed liquid crystal layer 11 between the first electrode layer 12 and the second electrode layer 15 is controlled to be in an ordered state or a disordered state by applying different voltages between the first electrode layer 12 and the second electrode layer 15. When the polymer dispersed liquid crystal layer 11 is in the ordered state, it has no scattering effect on light, and the collimated light emitted to the optical adjusting film still maintains a collimated state when having passed through the optical adjusting film. When the polymer dispersed liquid crystal layer 11 is in the disordered state, it has a scattering effect on light, and the collimated light emitted to the optical adjusting film has a large divergence angle when having passed through the optical adjusting film.

Figure 4:
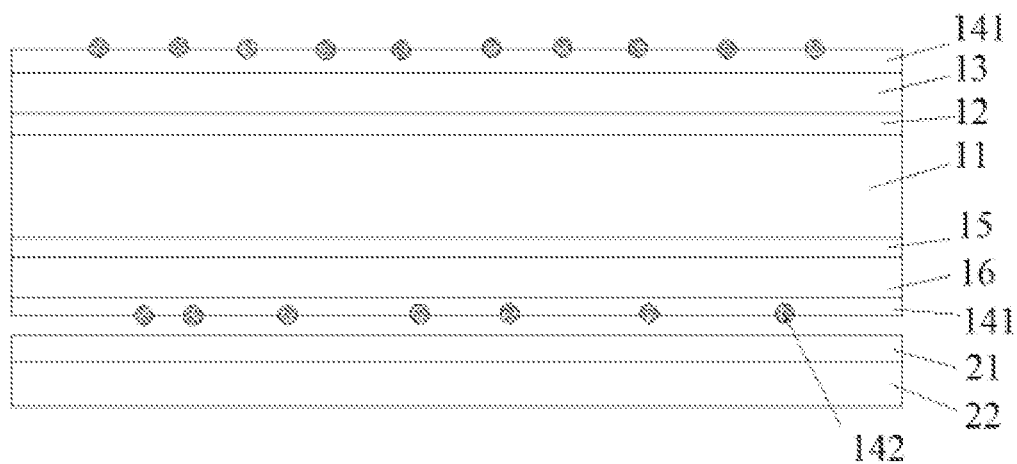
FIG. 4 is a schematic structural diagram of a backlight module according to an embodiment of the present disclosure.
Figure 5:
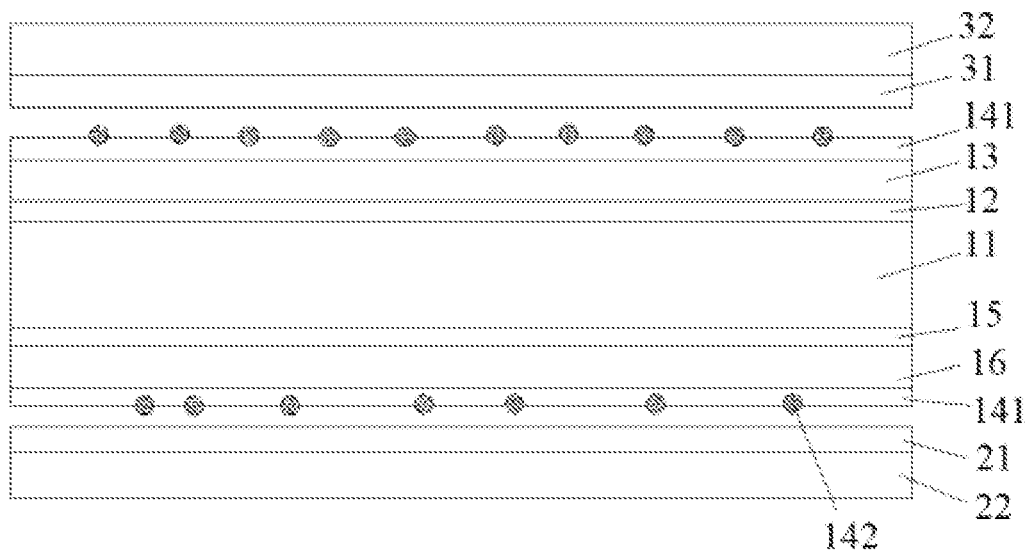
FIG. 5 is a schematic structural diagram of a display device according to an embodiment of the present disclosure.

With reference to FIGS. 4 and 5, the optical adjusting film may be applied to a backlight module or a display device, with one surface facing the anti-peek film 21 and the other surface facing the display panel 32. By taking the liquid crystal display panel as an example, a lower surface of the liquid crystal display panel is usually attached with a lower polarizer 31. In order to avoid the adsorption between the optical adjusting film and the anti-peek film 21 or the lower polarizer 31, the optical adjusting film according to the embodiment is further provided with an anti-adsorption surface layer 14.

That is, the optical adjusting film further includes the anti-adsorption surface layer 14 on a side of the first substrate 13 away from the second substrate 16 and/or a side of the second substrate 16 away from the first substrate 13, and the anti-adsorption surface layer 14 is configured to suppress adsorption between the optical adjusting film and a solid surface.

In an embodiment, the anti-adsorption surface layer 14 includes a substrate layer 141 and a plurality of anti-adsorption particles 142, and the anti-adsorption particles 142 are beyond a surface of the substrate layer 141 away from the polymer dispersed liquid crystal layer 11. That is, the surface of the optical adjusting film is rendered to be a relatively rough surface by the anti-adsorption particles 142 (specifically, hard tiny particles), so that the adsorption effect between the optical adjusting film and the solid surface can be suppressed.

In an embodiment, a diameter of the anti-adsorption particle 142 is greater than a thickness of the substrate layer 141. In this manner, it can be ensured that the anti-adsorption particles 142 can go beyond the surface of the substrate layer 141 away from the polymer dispersed liquid crystal layer 11 in a case where the anti-adsorption particles 142 and the substrate layer 141 are formed as a single piece.

In an embodiment, the material of the substrate layer 141 includes an ultraviolet curable resin or a thermosetting resin, for example, ultraviolet curing resin materials such as acrylic resins, urethane acrylate resins, and polyester acrylate (PEA) resins, and thermosetting resin materials such as urethane resins and polyurethane (PU) resins. In an embodiment, other additives may be included in the substrate layer 141, such as photopolymerization initiators, curing agents, crosslinking agents, photosensitizers, and the like, or combinations thereof. In this embodiment, the substrate layer 141 also serves as a hard coat. The anti-adsorption surface layer 14 may be prepared by incorporating the anti-adsorption particles 142 into these materials and then hardening them. Note that, in this embodiment, the surface of the finally prepared anti-adsorption surface layer 14, on which the substrate layer 141 and the anti-adsorption particles 142 are exposed, is usually adhered with a very thin layer of the material of the substrate layer 141.

In an embodiment, the material of the anti-adsorption particles 142 includes any one of silicone, polystyrene (PS), polycarbonate (PC), calcium carbonate ($CaCO_3$). The anti-adsorption particles 142 made of these materials are commercially available.

In an embodiment, the height h of the anti-adsorption particle 142 beyond the surface of the substrate layer 141 satisfies: h≥1 μm. Inventors found that if the height of the anti-adsorption particle 142 beyond the surface of the substrate layer 141 is too small, the anti-adsorption effect between the optical adjusting film and the lower polarizer 31 or the anti-peek film 21 is not significant. Table 1 below shows specific experimental results.

TABLE 1 influence of the size of the anti-adsorption particle on the adsorption and display effects

| | | | | |
|---|---|---|---|---|
| Height of the anti-adsorption particle 142 beyond the surface of the substrate layer 141 | Less than 1 μm | 1 μm-1.5 μm | 1.5 μm-2 μm | More than 2 μm |
| Adsorption degree between the optical adjusting film and the lower polarizer 31 | Serious adsorption | No adsorption | No adsorption | No adsorption |

TABLE 1-continued influence of the size of the anti-adsorption particle on the adsorption and display effects

| Adsorption degree between the optical adjusting film and the anti-peek film 21 | Serious adsorption | Moderate adsorption | Slight adsorption | Slight adsorption |
|---|---|---|---|---|
| Status and effect of the backlight module | Failure | Large area of Newton's rings are visible | Slight Newton's rings are visible | Slight Newton's rings are visible |
| Status and effect of the display module | Failure | Qualified picture quality | Qualified picture quality | Qualified picture quality |

Although the larger the height of the anti-adsorption particle 142 beyond the substrate layer 141, the better the adsorption effect between the optical adjusting film and the structure above or below it is suppressed, the too large height of the anti-adsorption particle 142 beyond the substrate layer 141 may affect the transmittance of the entire display.

Inventors found that the height of the anti-adsorption particle 142 beyond the substrate layer 141 is generally not much different from the size of the radius thereof. Therefore, based on the above considerations, in the embodiment, a diameter D of the anti-adsorption particle 142 satisfies: 2 μm≤D≤4 μm.

It should be noted that the density of the anti-adsorption particle 142 distributed on the surface of the substrate layer 141 has little influence on the anti-adsorption effect. By taking the radius of the anti-adsorption particle 142 being 1.5 μm as an example, there is not much difference in the anti-adsorption effect between the cases of 45, 50, and 60 anti-adsorption particles 142 distributed in an area of 1 mm². Similarly, by taking the radius of the anti-adsorption particles 142 being 3 μm as an example, there is not much difference in the anti-adsorption effect between the cases of 45, 50, and 60 anti-adsorption particles 142 distributed in an area of 1 mm².

In an embodiment, static friction coefficient k between the anti-adsorption surface layer 14 and the lower polarizer 31 satisfies: k≤0.35. In an embodiment, static friction coefficient k between the anti-adsorption surface layer 14 and the anti-peek film 21 satisfies: k≤0.35. Inventors found that the smaller the static friction coefficient between the anti-adsorption surface layer 14 and another solid surface, the more favorable it is to suppress the adsorption effect.

In an embodiment, a contact angle a of distilled water with respect to a surface of the anti-adsorption surface layer 14 away from the polymer dispersed liquid crystal layer 11 satisfies: a≥70°. Inventors found that the larger the contact angle of distilled water with respect to the surface of the anti-adsorption surface layer 14 away from the polymer dispersed liquid crystal layer 11 is, the more favorable it is to suppress the adsorption effect.

In an embodiment, the first substrate 13 includes a base material layer 131, an anti-scratch layer 132, and an undercoat layer 133 stacked in this order in a direction from the first substrate 13 to the polymer dispersed liquid crystal layer 11. In an embodiment, the second substrate 16 includes a base material layer 161, an anti-scratch layer 162, and an undercoat layer 163 stacked in this order in a direction from the second substrate 16 to the polymer dispersed liquid crystal layer 11.

The material of the base material layers 131, 161 may usually be polyethylene terephthalate (PET), which has characteristics of high light transmittance, less rainbow patterns caused by surface hardening treatment, and low heat shrinkage. The materials of the anti-scratch layers 132, 162 may be the same as that of the substrate layer 141. The materials of the undercoat layers 133, 163 are, for example, polyester resin, silicone resin (DC resin), or the like. The function of the undercoat layers 133, 163 is to provide flat surfaces for the first electrode layer 12 and the second electrode layer 15 described above.

Referring to FIG. 4, the embodiment provides a backlight module, which includes an optical adjusting film and an anti-peek film 21 stacked with each other, and the optical adjusting film is the optical adjusting film according to the above embodiment. Also shown in FIG. 4 is an optical film 22 on a side of the anti-peek film 21 away from the optical adjusting film. The optical film 22 is, for example, a prism sheet, a diffusion sheet, a light guide plate, or the like. Other parts of the backlight module may be designed according to conventional schemes, and are not shown.

The adsorption effect between the optical adjusting film and the anti-peek film 21 in the backlight module or between the optical adjusting film and the lower polarizer 31 after assembled to form the display device in a subsequent process is suppressed or eliminated, so that the display quality can be ensured.

Referring to FIG. 5, the embodiment provides a display device including a display panel 32 and an optical adjusting film stacked with each other, and the optical adjusting film is the optical adjusting film according to the above embodiment.

In an embodiment, the display device may be any product or component having a display function, such as a device formed by attaching the liquid crystal display panel 32 and an optical adjusting film, a liquid crystal display module, a mobile phone, a tablet computer, a television, a display, a notebook computer, a digital photo frame, and a navigator.

The adsorption effect between the optical adjusting film and the anti-peek film 21 (if any) or the lower polarizer 31 (if any) in the display device is suppressed or eliminated, thereby ensuring the display quality.

In an embodiment, the lower polarizer 31 shown in FIG. 5 may be a wire grating polarizer integrated inside the display panel 32. In this case, the adsorption effect between the optical adjusting film and the display panel 32 can be suppressed or eliminated.

It will be understood that the above embodiments are merely exemplary embodiments employed to illustrate the principles of the present disclosure, and the present disclosure is not limited thereto. It will be apparent to those skilled in the art that various changes and modifications can be made therein without departing from the spirit and scope of the disclosure, and these changes and modifications are to be considered within the scope of the disclosure.

What is claimed is:

1. An optical adjusting film comprising:
   a first substrate and a second substrate opposite to each other;
   a first electrode layer on a side of the first substrate facing the second substrate;
   a second electrode layer on a side of the second substrate facing the first substrate;
   a polymer dispersed liquid crystal layer between the first electrode layer and the second electrode layer; and
   an anti-adsorption surface layer on a side of the first substrate away from the second substrate, and/or on a side of the second substrate away from the first substrate, the anti-adsorption surface layer being configured to suppress adsorption between the optical adjusting film and a solid surface,
wherein static friction coefficient k between the anti-adsorption surface layer and a lower polarizer satisfies: k≤0.35,
static friction coefficient k between the anti-adsorption surface layer and an anti-peek film satisfies: k≤0.35; and
a contact angle a of distilled water with respect to a surface of the anti-adsorption surface layer away from the polymer dispersed liquid crystal layer satisfies: a≥70°.

2. The optical adjusting film of claim 1, wherein the anti-adsorption surface layer comprises a substrate layer and a plurality of anti-adsorption particles, and the plurality of anti-adsorption particles are beyond a surface of the substrate layer away from the polymer dispersed liquid crystal layer.

3. The optical adjusting film of claim 2, wherein a diameter of the anti-adsorption particle is greater than a thickness of the substrate layer.

4. The optical adjusting film of claim 2, wherein a material of the substrate layer comprises an ultraviolet curable resin or a thermosetting resin.

5. The optical adjusting film of claim 4, wherein the substrate layer further comprises at least one of a photopolymerization initiator, a curing agent, a cross-linking agent, and a photosensitizer.

6. The optical adjusting film of claim 2, wherein a material of the anti-adsorption particle comprises any one of silicone, polystyrene, polycarbonate, and calcium carbonate.

7. The optical adjusting film of claim 2, wherein a height h of the anti-adsorption particle beyond the surface of the substrate layer satisfies: h≥1 μm.

8. The optical adjusting film of claim 2, wherein a diameter D of the anti-adsorption particle satisfies: 2 μm≤D≤4 μm.

9. The optical adjusting film of claim 1, wherein the first substrate comprises a base material layer, an anti-scratch layer, and an undercoat layer stacked in this order in a direction from the first substrate to the polymer dispersed liquid crystal layer.

10. The optical adjusting film of claim 1, wherein the second substrate comprises a base material layer, an anti-scratch layer, and an undercoat layer stacked in this order in a direction from the second substrate to the polymer dispersed liquid crystal layer.

11. The optical adjusting film of claim 9, wherein materials of the base material layer and the anti-scratch layer comprise polyethylene terephthalate.

12. The optical adjusting film of claim 9, wherein a material of the undercoat layer comprises polyester resin or silicone resin.

13. A backlight module, comprising an optical adjusting film and the anti-peek film stacked with each other, wherein
the optical adjusting film is the optical adjusting film of claim 1,
the optical adjusting film comprises the anti-adsorption surface layer on the side of the second substrate away from the first substrate, and
the anti-peek film is on a side of the anti-adsorption surface layer away from the second substrate.

14. The backlight module of claim 13, further comprising an optical film on a side of the anti-peek film away from the anti-adsorption surface layer.

15. The backlight module of claim 14, wherein the optical film is a prism sheet, a diffusion sheet, or a light guide plate.

16. A display device, comprising a display panel and an optical adjusting film stacked with each other, wherein the optical adjusting film is the optical adjusting film of claim 1.

17. The display device of claim 16, further comprising the lower polarizer, the anti-peek film and an optical film, wherein
the display panel, the lower polarizer, the optical adjusting film, the anti-peek film and the optical film are sequentially stacked, and
the optical adjusting film comprises the anti-adsorption surface layer on the side of the first substrate away from the second substrate, and on the side of the second substrate away from the first substrate.

* * * * *